United States Patent
Li et al.

(10) Patent No.: US 11,185,893 B2
(45) Date of Patent: Nov. 30, 2021

(54) PERACID COMPOSITIONS WITH CONDUCTIVITY MONITORING CAPABILITY

(71) Applicant: ECOLAB USA INC., Saint Paul, MN (US)

(72) Inventors: Junzhong Li, Saint Paul, MN (US); Caleb Power, Saint Paul, MN (US); Allison Prideaux, Saint Paul, MN (US); Richard K. Staub, Saint Paul, MN (US); Vaideeswaran Sivaswamy, Saint Paul, MN (US); John Paul Koehl, Saint Paul, MN (US)

(73) Assignee: Ecolab USA Inc., Saint Paul, MN (US)

( * ) Notice: Subject to any disclaimer, the term of this patent is extended or adjusted under 35 U.S.C. 154(b) by 0 days.

(21) Appl. No.: 15/929,949

(22) Filed: May 29, 2020

(65) Prior Publication Data
US 2020/0378879 A1    Dec. 3, 2020

Related U.S. Application Data

(60) Provisional application No. 62/855,209, filed on May 31, 2019.

(51) Int. Cl.
*B08B 3/04*    (2006.01)
*B08B 3/00*    (2006.01)

(52) U.S. Cl.
CPC . *B08B 3/04* (2013.01); *B08B 3/00* (2013.01)

(58) Field of Classification Search
CPC .................................... B08B 3/00; B08B 3/04
See application file for complete search history.

(56) References Cited

U.S. PATENT DOCUMENTS

| 2,955,905 | A | 10/1960 | Davies et al. |
| 3,256,198 | A | 6/1966 | Matzner |
| 6,558,529 | B1 * | 5/2003 | McVey .............. G01N 27/4045 134/113 |

(Continued)

FOREIGN PATENT DOCUMENTS

| CA | 2084172 A1 | 6/1993 |
| CA | 2152908 C | 7/1994 |

(Continued)

OTHER PUBLICATIONS

Zent, Apotheke, "Stability of Wofatit ion exchangers against peracetic acid Part 2: Peracetic acid disinfection of ion exchangers", Pharmazie, vol. 37(5), pp. 387-388, 1982.

(Continued)

*Primary Examiner* — Sharidan Carrillo
(74) *Attorney, Agent, or Firm* — McKee, Voorhees & Sease, PLC

(57) ABSTRACT

Peroxycarboxylic acid compositions comprising compatible ionic compounds to deliver conductivity signals to enable monitoring of the peroxycarboxylic acid concentration by conductivity when diluted for use are disclosed. Methods of measuring peroxycarboxylic acid concentration by conductivity are also disclosed. Beneficially, conductivity measurement allows a user to determine concentration of the peroxycarboxylic acid at a point of use without cumbersome titration steps to determine the concentration providing various benefits at an application of use.

11 Claims, 7 Drawing Sheets

(56) References Cited

U.S. PATENT DOCUMENTS

| | | | |
|---|---|---|---|
| 7,828,905 B2 | 11/2010 | Smith et al. | |
| 8,343,437 B2 | 1/2013 | Patel | |
| 8,568,613 B2 | 10/2013 | Man et al. | |
| 8,617,466 B2 | 12/2013 | Herdt et al. | |
| 8,822,719 B1* | 9/2014 | Li | A01N 37/02 |
| | | | 562/2 |
| 8,828,316 B2 | 9/2014 | Herdt et al. | |
| 9,288,992 B2 | 3/2016 | Li et al. | |
| 9,585,397 B2 | 3/2017 | Li et al. | |
| 9,675,076 B2 | 6/2017 | Li et al. | |
| 10,031,081 B2 | 7/2018 | Li et al. | |
| 10,165,774 B2 | 1/2019 | Li et al. | |
| 10,172,351 B2 | 1/2019 | Kraus et al. | |
| 10,837,949 B1* | 11/2020 | Warburton | G01N 33/0047 |
| 2010/0136705 A1 | 6/2010 | Kojima et al. | |
| 2014/0256811 A1* | 9/2014 | Li | A01N 59/00 |
| | | | 514/558 |
| 2015/0110894 A1* | 4/2015 | Li | C02F 1/50 |
| | | | 424/616 |
| 2016/0150779 A1 | 6/2016 | Li et al. | |
| 2016/0176814 A1* | 6/2016 | Balasubramanian | |
| | | | C07C 409/24 |
| | | | 514/714 |
| 2017/0064949 A1* | 3/2017 | Kraus | A23L 3/3499 |
| 2017/0295784 A1* | 10/2017 | Bolduc | A01N 59/00 |
| 2018/0172651 A1 | 6/2018 | Balasubramanian et al. | |
| 2019/0069545 A1 | 3/2019 | Li et al. | |
| 2019/0069547 A1 | 3/2019 | Kraus et al. | |
| 2020/0378879 A1* | 12/2020 | Li | B08B 3/04 |

FOREIGN PATENT DOCUMENTS

| | | |
|---|---|---|
| EP | 2566943 B1 | 9/2017 |
| JP | 2005146101 A | 6/2005 |
| WO | 2014137605 A1 | 9/2014 |

OTHER PUBLICATIONS

Ecolab, "Synergex (US)", Safety Data Sheet, 13 pages, issued May 13, 2019.

International Searching Authority in connection with PCT/US2020/035050 filed May 29, 2020, "The International Search Report and the Written Opinion of the International Searching Authority, or the Declaration", 17 pages, dated Sep. 21, 2020.

* cited by examiner

PERACID COMPOSITIONS WITH CONDUCTIVITY MONITORING CAPABILITY

CROSS-REFERENCE TO RELATED APPLICATION

This application claims priority under 35 U.S.C. § 119 to Provisional Application U.S. Ser. No. 62/855,209, filed on May 31, 2019, which is herein incorporated by reference in its entirety including without limitation, the specification, claims, and abstract, as well as any figures, tables, or examples thereof.

FIELD OF THE INVENTION

The invention relates to peroxycarboxylic acid ("peracid") compositions comprising compatible ionic compounds to deliver conductivity signals to enable monitoring of the peroxycarboxylic acid concentration by conductivity when diluted for use. Methods of measuring peroxycarboxylic acid concentration by conductivity are also provided. Beneficially, conductivity measurement allows a user to determine concentration of the peroxycarboxylic acid at a point of use without cumbersome titration steps to determine the concentration providing various benefits at an application of use.

BACKGROUND OF THE INVENTION

Peroxycarboxylic acid compositions can be made through acid catalyzed equilibrium reactions, often generated in a chemical plant and then shipped to customers for on-site use. Due to inherent manufacturing, storage, shipping, and stability limitations of peroxycarboxylic acids, on-site generation of peroxycarboxylic acids are increasingly in demand. Regardless of the source of a peroxycarboxylic acid stability challenges remain and present challenges for accurate dosing and application of peroxycarboxylic acid concentrations. Depending upon the particular peroxycarboxylic acid, the half-life can vary from the order of minutes to hours, to weeks to months.

Peroxycarboxylic acids are extremely useful and effective in various field of technology such as cleaning, disinfection, sanitizing, sterilizing, in spite of inherent stability limitations. Therefore, accurate dosing and delivery of peroxycarboxylic acids is needed to ensure the desired cleaning, disinfection, sanitizing, or sterilizing is achieved.

A conventional method to ensure accurate dosing and delivery of cleaning compositions, such as peroxycarboxylic acids is titration, which is a well-known and practiced method to determine concentrations of components of a solution. Titrations of various chemistries are practiced, wherein generally a titrant is added to a solution in which it reacts with select components thereof. Once the entirety of the reacting component has reacted with the known titrant, a measurable or noticeable change occurs, indicating the reaction is complete. In some cases, the noticeable change comprises a color change. Color changes, for example, can vary widely across various chemistries of titrations.

Titrations can be a tedious process, requiring careful practice by a chemist or other skilled operator. In some instances, it may be impractical to keep a chemist or other technician on hand to perform titrations, though data acquired by titrations may be desirable. Automated titrators may be implemented which attempt to judge when complete reactions have occurred and the appropriate titration calculations to determine an amount of a component in a solution. However, depending on the reaction, it may be difficult for an automated process to accurately determine an endpoint of a reaction. Additionally, automated systems may require a large amount of time to complete a process, which may be undesirable or unacceptable if a solution needs monitoring at certain time intervals. Although advances in titrating devices have been made, the process is not preferred by many in the field dosing cleaning compositions, such as peroxycarboxylic acids. Instead, a common practice is simply to over dispense or delivery a cleaning composition for insurance that a minimum required threshold is being provided. However, this can result in unwanted delivery of excess chemistry and waste of chemistry leading to increased costs.

Therefore, there remains a need for methods to accurately determine the dosing and delivery concentrations of peroxycarboxylic acids.

It is therefore an object of this disclosure to provide compositions with ionic compounds that are compatible with peroxycarboxylic acids to allow conductivity measurements to determine the concentration of peroxycarboxylic acids.

It is a further object of the disclosure to provide organic peroxycarboxylic acid compositions capable of measurement by conductivity in use solution.

It is another object of this disclosure to formulate organic peroxycarboxylic acid compositions that contain ionic compounds compatible with peroxycarboxylic acid, namely peroxyacetic acid, and capable of measurement by conductivity in use solution.

Other objects, aspects and advantages of this invention will be apparent to one skilled in the art in view of the following disclosure, the drawings, and the appended claims.

SUMMARY OF THE INVENTION

An advantage of the invention is to enable the monitoring of the peroxycarboxylic acid concentration by conductivity when diluted for use. The conductivity measurement beneficially allows a user to determine concentration of the peroxycarboxylic acid at a point of use without cumbersome titration steps to determine the concentration providing various benefits at an application of use.

In an embodiment, a method of monitoring a peroxycarboxylic acid concentration comprises: providing a use solution of a peroxycarboxylic acid composition comprising an ionic compound; contacting a conductivity probe or sensor to the use solution; and detecting conductivity signals to determine a peroxycarboxylic acid concentration in the use solution.

In a further embodiment, a peroxycarboxylic acid forming composition with conductivity monitoring capability comprises: a C1-C22 carboxylic acid; a hydrogen peroxide source; water; an ionic compound; and a stabilizing agent.

In a further embodiment, a peroxycarboxylic acid composition with conductivity monitoring capability comprises: from about 5-20 wt-% peroxyacetic acid; from about 15-40 wt-% acetic acid; from about 5-50 wt-% hydrogen peroxide; water; from about 5-50 wt-% an ionic compound; and from about 0.001-5 wt-% stabilizing agent.

While multiple embodiments are disclosed, still other embodiments will become apparent to those skilled in the art from the following detailed description, which shows and describes illustrative embodiments. Accordingly, the drawings and detailed description are to be regarded as illustrative in nature and not restrictive.

Figure 1:
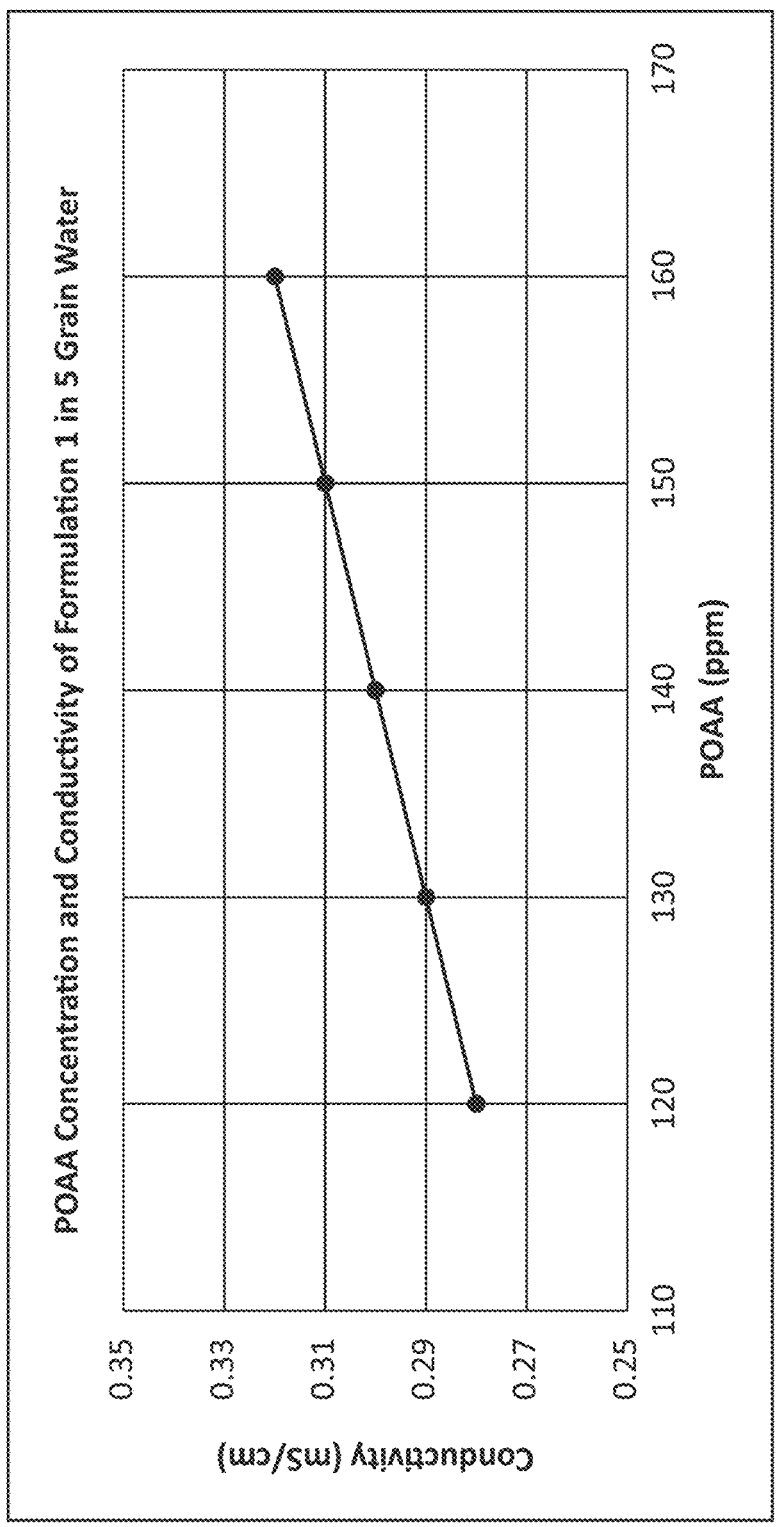
FIG. 1 shows a graph measurement of peroxyacetic acid concentration and conductivity measurement using Formulation 1 of the evaluated peroxycarboxylic acid compositions disclosed in the Examples.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENTS

The embodiments are not limited to particular peroxycarboxylic acid compositions containing ionic compounds and/or methods of using conductivity methods to measure a peroxycarboxylic acid composition concentration, which can vary and are understood by skilled artisans. It has been surprisingly found that peroxycarboxylic acid compositions can accurately be measured by conductivity to enable users of the compositions to quickly determine the concentration for dosing the compositions, which provides various benefits and applications of use previously unavailable for peroxycarboxylic acid compositions.

It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form. Numeric ranges recited within the specification are inclusive of the numbers within the defined range. Throughout this disclosure, various aspects are presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range (e.g. 1 to 5 includes 1, 1.5, 2, 2.75, 3, 3.80, 4, and 5).

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments without undue experimentation, but the preferred materials and methods are described herein. In describing and claiming the embodiments, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts.

As used herein, the term "free" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

As used herein, the terms "mixed" or "mixture" when used relating to "peroxycarboxylic acids" or "peroxycarboxylic acid composition" refer to a composition or mixture including more than one peroxycarboxylic acid.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods and compositions may comprise, consist essentially of, or consist of the components and ingredients as well as other ingredients described herein. As used herein, "consisting essentially of" means that the methods and compositions may include additional steps, components or ingredients, but only if the additional steps, components or ingredients do not materially alter the basic and novel characteristics of the claimed methods and compositions.

Peroxycarboxylic Acid Compositions

According to embodiments, the peroxycarboxylic acid compositions include the peroxycarboxylic acid, carboxylic acid, oxidizing agent, water, ionic compound, and optional additional ingredients, such as stabilizing agents. The compositions can include additional functional ingredients and can be provided as concentrate or use compositions. Exemplary peroxycarboxylic acid forming compositions are shown in Tables 1A and 1B and peroxyacetic acid forming compositions are shown in Table 2 in weight percentage.

TABLE 1A

| Material | First Exemplary Range wt.-% | Second Exemplary Range wt.-% | Third Exemplary Range wt.-% |
| --- | --- | --- | --- |
| Carboxylic acid | 10-50 | 15-50 | 15-40 |
| Oxidizing Agent | 10-70 | 20-70 | 25-65 |
| Water | 0-30 | 0.1-20 | 0.5-15 |
| Ionic Compound | 5-50 | 10-50 | 15-40 |
| Additional Functional Ingredients | 0-50 | 0-40 | 0-30 |

TABLE 1B

| Material | First Exemplary Range wt.-% | Second Exemplary Range wt.-% | Third Exemplary Range wt.-% |
| --- | --- | --- | --- |
| Carboxylic acid | 10-50 | 15-50 | 15-40 |
| Oxidizing Agent | 10-70 | 20-70 | 25-65 |
| Water | 0-30 | 0.1-20 | 0.5-15 |
| Ionic Compound | 5-50 | 10-50 | 15-40 |
| Stabilizing Agent | 0-5 | 0.001-5 | 0.01-1 |
| Additional Functional Ingredients | 0-50 | 0-40 | 0-30 |

TABLE 2

| Material | First Exemplary Range wt.-% | Second Exemplary Range wt.-% | Third Exemplary Range wt.-% |
| --- | --- | --- | --- |
| Acetic acid | 10-50 | 15-50 | 15-40 |
| Oxidizing Agent | 10-70 | 20-70 | 25-65 |
| Water | 0-30 | 0.1-20 | 0.5-15 |
| Ionic Compound | 5-50 | 10-50 | 15-40 |
| Stabilizing Agent | 0-5 | 0.001-5 | 0.01-1 |
| Additional Functional Ingredients | 0-50 | 0-40 | 0-30 |

Exemplary peroxycarboxylic acid compositions are shown in Tables 3A and 3B and peroxyacetic acid compositions are shown in Table 4 in weight percentages. The peroxycarboxylic acid compositions are equilibrium compositions.

TABLE 3A

| Material | First Exemplary Range wt.-% | Second Exemplary Range wt.-% | Third Exemplary Range wt.-% |
| --- | --- | --- | --- |
| Peroxycarboxylic acid | 5-30 | 5-20 | 5-15 |
| Carboxylic acid | 5-50 | 15-40 | 15-30 |
| Oxidizing Agent | 5-50 | 5-40 | 5-30 |
| Water | 0-30 | 0.1-20 | 0.5-15 |
| Ionic Compound | 5-50 | 10-50 | 15-40 |
| Additional Functional Ingredients | 0-50 | 0-40 | 0-30 |

TABLE 3B

| Material | First Exemplary Range wt.-% | Second Exemplary Range wt.-% | Third Exemplary Range wt.-% |
| --- | --- | --- | --- |
| Peroxycarboxylic acid | 5-30 | 5-20 | 5-15 |
| Carboxylic acid | 5-50 | 15-40 | 15-30 |
| Oxidizing Agent | 5-50 | 5-40 | 5-30 |
| Water | 0-30 | 0.1-20 | 0.5-15 |
| Ionic Compound | 5-50 | 10-50 | 15-40 |
| Stabilizing Agent | 0-5 | 0.001-5 | 0.01-1 |
| Additional Functional Ingredients | 0-50 | 0-40 | 0-30 |

TABLE 4

| Material | First Exemplary Range wt.-% | Second Exemplary Range wt.-% | Third Exemplary Range wt.-% |
| --- | --- | --- | --- |
| Peroxyacetic acid | 5-30 | 5-20 | 5-15 |
| Acetic acid | 5-50 | 15-40 | 15-30 |
| Oxidizing Agent | 5-50 | 5-40 | 5-30 |
| Water | 0-30 | 0.1-20 | 0.5-15 |
| Ionic Compound | 5-50 | 10-50 | 15-40 |
| Stabilizing Agent | 0-5 | 0.001-5 | 0.01-1 |
| Additional Functional Ingredients | 0-50 | 0-40 | 0-30 |

In various aspects of the embodiments, including those described in Tables 1-4, the peroxycarboxylic acid compositions meet the requirements of organic certification by National Organic Program. In some embodiments, the ionic compounds and oxidizing agent, along with the peroxycarboxylic acid compositions, meet the requirements for organic certification.

Peroxycarboxylic Acid Composition

Peroxycarboxylic (or percarboxylic) acids generally have the formula $R(CO_3H)_n$, where, for example, R is an alkyl, arylalkyl, cycloalkyl, aromatic, or heterocyclic group, and n is one, two, or three, and named by prefixing the parent acid with peroxy. The R group can be saturated or unsaturated as well as substituted or unsubstituted. The compositions can include a mixture or combination of several different peroxycarboxylic acids. Such compositions are often referred to as mixed peroxycarboxylic acids or mixed peroxycarboxylic acid compositions. For example, in some embodiments, the composition includes one or more C1 to C4 peroxycarboxylic acids and one or more C5 to C22 peroxycarboxylic acids.

As referred to herein the methods of use and compositions can either include peroxycarboxylic acid (or peroxycarboxylic acid compositions comprising the peroxycarboxylic acid, carboxylic acid, hydrogen peroxide, water and optional additional components), or mixed peroxycarboxylic acids (or mixed peroxycarboxylic acid compositions comprising more than one peroxycarboxylic acid, more than one carboxylic acid, hydrogen peroxide, water and optional additional components).

The peroxycarboxylic acid composition can be formed by combining one or more carboxylic acids and an oxidizing agent (e.g. hydrogen peroxide). The peroxycarboxylic acid compositions monitored by conductivity have a pH of about 2 to 9 in use solution, or about 2 to 5, or below about 5, when diluted from various types of water. In a preferred embodiment the peroxycarboxylic acid composition comprises as peroxyacetic acid.

Carboxylic Acids

The peroxycarboxylic acids compositions are formed by combining at least one carboxylic acid with an oxidizing agent. In some embodiments, at least two, at least three, or at least four or more carboxylic acids can be employed. The carboxylic acid for use with the compositions of the present invention is a C1 to C22 carboxylic acid. In some embodiments, the carboxylic acid for use with the compositions of the present invention is a C5 to C11 carboxylic acid. In some embodiments, the carboxylic acid is a C1 to C5 carboxylic acid. Examples of suitable carboxylic acids include, but are not limited to, formic, acetic, propionic, butanoic, pentanoic, hexanoic, heptanoic, octanoic, nonanoic, decanoic, undecanoic, dodecanoic, as well as their branched isomers, lactic, maleic, ascorbic, citric, hydroxyacetic, neopentanoic, neoheptanoic, neodecanoic, oxalic, malonic, succinic, glutaric, adipic, pimelic subric acid, and mixtures thereof.

Preferred carboxylic acids include those that are organic compounds and/or approved as organic certified, such as acetic acid to produce peroxyacetic acid.

In some embodiments, the carboxylic acid is included in the peroxycarboxylic acid forming composition at an amount of at least about 5 wt-% to about 50 wt-%, about 15 wt-% to about 50 wt-%, about 15 wt-% to about 40 wt-%, or about 15 wt-% to about 30 wt-%. In addition, without being limited according to the invention, all ranges recited are inclusive of the numbers defining the range and include each integer within the defined range.

Oxidizing Agent

The peroxycarboxylic acids compositions are formed by combining at least one carboxylic acid with an oxidizing agent. Examples of inorganic oxidizing agents include the following types of compounds or sources of these compounds, or alkali metal salts including these types of compounds, or forming an adduct therewith: hydrogen peroxide, or hydrogen peroxide donors of: group 1 (IA) oxidizing agents, for example lithium peroxide, sodium peroxide; group 2 (IIA) oxidizing agents, for example magnesium peroxide, calcium peroxide, strontium peroxide, barium peroxide; group 12 (IIB) oxidizing agents, for example zinc peroxide; group 13 (IIIA) oxidizing agents, for example boron compounds, such as perborates, for example sodium perborate hexahydrate of the formula $Na_2[BiO_2MOH)_4]\cdot 6H_2O$ (also called sodium perborate tetrahydrate); sodium peroxyborate tetrahydrate of the formula $Na_2BiO2)_2[(OH)_4]\cdot 4H_2O$ (also called sodium perborate trihydrate); sodium peroxyborate of the formula $Na_2[BiO2)iOH)_4]$ (also called sodium perborate monohy-drate); group 14 (IVA) oxidizing agents, for example persili-cates and peroxycarbonates, which are also called percarbon-ates, such as per-silicates or peroxycarbonates of alkali metals; group 15 (VA) oxidizing agents, for example peroxynitrous acid and its salts; peroxyphosphoric acids and their salts, for example, perphosphates; group 16 (VIA) oxidizing agents, for example peroxysulfuric acids and their salts, such as peroxymonosulfuric and peroxydisulfuric acids, and their salts, such as persulfates, for example, sodium persulfate; and group VIIa oxidizing agents such as sodium periodate, potas-sium perchlorate. Other active inorganic oxygen compounds can include transition metal peroxides; and other such peroxygen compounds, and mixtures thereof.

In some embodiments, the compositions and methods of the present invention employ one or more of the inorganic oxidizing agents listed above. Suitable inorganic oxidizing agents include ozone, hydrogen peroxide, hydrogen peroxide adduct, group IIIA oxidizing agent, or hydrogen peroxide 30 donors of group VIA oxidizing agent, group VA oxidizing agent, group VIIA oxidizing agent, or mixtures thereof. Suitable examples of such inorganic oxidizing agents include percarbonate, perborate, persulfate, perphosphate, persilicate, or mixtures thereof.

Hydrogen peroxide presents one suitable example of an inorganic oxidizing agent. Hydrogen peroxide can be provided as a mixture of hydrogen peroxide and water, e.g., as liquid hydrogen peroxide in an aqueous solution. Hydrogen peroxide is commercially available at concentrations of 35%, 40-70%, and 90% in water. For safety, the 35-50% is commonly used.

Preferred oxidizing agents include those that are organic compounds and/or approved as organic certified, such as hydrogen peroxide.

In some embodiments, the oxidizing agent is included in the peroxycarboxylic acid forming composition at an amount of at least about 10 wt-% to about 70 wt-%, about 15 wt-% to about 70 wt-%, about 20 wt-% to about 70 wt-%, or about 25 wt-% to about 65 wt-%. In addition, without being limited according to the invention, all ranges recited are inclusive of the numbers defining the range and include each integer within the defined range.

Water

In some embodiments, the peroxycarboxylic acid forming compositions can include water. Water can be independently added to the composition or can be provided in the composition as a result of its presence in an aqueous material that is added to the composition. In some embodiments, the composition includes about 0 wt % to about 30 wt % water, about 0.1 wt % to about 30 wt % water, about 0.1 wt % to about 20 wt % water, or about 0.5 wt % to about 15 wt % water. It is to be understood that all values and ranges between these values and ranges are encompassed by the present invention.

Ionic Compounds

The peroxycarboxylic acid compositions comprises at least one ionic compound to deliver conductivity signals to enable monitoring of the peroxycarboxylic acid concentration by conductivity when diluted for use. The ionic compound must be compatible with the peroxycarboxylic acid without decreasing stability and/or antimicrobial efficacy. Suitable ionic compounds include but are not limited to alkaline metal salts, alkaline earth metal salts, such as magnesium salts and hydronium salts.

Preferably, the ionic compounds are magnesium salts. Exemplary magnesium salts include, but are not limited to, magnesium acetate, magnesium benzoate, magnesium citrate, magnesium formate, magnesium hexafluorosilicate, magnesium hydroxide, magnesium lactate, magnesium molybdate, magnesium nitrate, magnesium perchlorate, magnesium phosphonate, magnesium salicylate, magnesium sulfate, magnesium sulfite, a hydrate thereof, and a mixture thereof.

Preferred magnesium salts include magnesium sulfate, magnesium acetate and magnesium nitrate. Still further preferred magnesium salts include organic compounds and/or those approved as GRAS for direct food contact, such as magnesium sulfate.

Exemplary aluminum salts include, but are not limited to, aluminum acetate, aluminum benzoate, aluminum citrate, aluminum formate, aluminum hexafluorosilicate, aluminum lactate, aluminum molybdate, aluminum nitrate, aluminum perchlorate, aluminum phosphonate, aluminum salicylate, aluminum sulfate, a hydrate thereof, and a mixture thereof.

Hydronium salts are salts of acids having the general formula $H_3O^+A-$. Exemplary hydronium salts include but not limited to hydronium sulfate, hydrogen sulfate, nitrate, phosphate, phosphonate, sulfonate, acetate, formate, citrate, lactate and gluconate. Preferably, hydronium sulfate i.e. sulfuric acid, $H_2SO_4$, is used in the peroxycarboxylic acid composition to provide conductivity, as it is very efficient in delivering conductivity.

As an additional benefit, the use of the hydronium salt, e.g. sulfuric acid provides further benefits for scale removal and biofilm. Without being limited to a particular mechanism of action, the sulfuric acid provides a low pH that prevents and removes mineral scales as well as beneficially provides efficacious biofilm kill and removal. In an embodiment, biofilm efficacy is obtained at pH of about 3 or below, or preferably about 2.3 or below. Accordingly, in preferred embodiments, the compositions containing hydronium salt ionic compound species (in some embodiments specifically sulfuric acid) at levels of at least about 5 wt-% provide efficacious performance against biofilms, providing stabilized peroxycarboxylic acid compositions that can be conductivity traced.

In some embodiments, the ionic compound is included in the peroxycarboxylic acid composition at an amount of at least about 5 wt-% to about 50 wt-%, about 10 wt-% to about 50 wt-%, about 10 wt-% to about 40 wt-%, or about 15 wt-% to about 40 wt-%. In addition, without being limited according to the invention, all ranges recited are inclusive of the numbers defining the range and include each integer within the defined range.

In an embodiment the ratio of the ionic compound to the peroxycarboxylic acid in the composition is between about 5 to 1 to 1 to 5 to ensure a conductivity signal can be detected. In other embodiments an increased ratio of ionic compound to the peroxycarboxylic acid will further provide the benefits of the conductivity signals. In some embodiments a ratio of the ionic compound to the peroxycarboxylic acid in the composition is between greater than 5 to 1, such as 6 to 1, 7 to 1, 8 to 1, 9 to 1, 10 to 1 or greater. Without being limited to a particular mechanism of action, the concentration of the ionic compound of at least about 5 wt-% provides sufficient concentration to ensure a conductivity signal can be detected. This is distinct from use of hydronium salts, e.g. sulfuric acid, or mineral acid catalysts in peroxycarboxylic acid compositions for catalyzing or accelerating a reaction to form an equilibrium peroxycarboxylic acid composition, as such concentrations are at lower amounts, such as less than about 1 wt-%, or less than about 2 wt-%. However, such conventional use of a mineral acid catalyst does not provide water conductivity for the composition.

Additional Functional Ingredients

The components of the peroxycarboxylic acid composition can be combined with various functional components suitable for uses disclosed herein. In some embodiments, the peroxycarboxylic acid composition including the peroxycarboxylic acid, carboxylic acid, hydrogen peroxide, ionic compound and water make up a large amount, or even substantially all of the total weight of the compositions. For example, in some embodiments few or no additional functional ingredients are disposed therein.

In other embodiments, additional functional ingredients may be included in the compositions. The functional ingredients provide desired properties and functionalities to the compositions. For the purpose of this application, the term "functional ingredient" includes a material that when dispersed or dissolved in a use and/or concentrate solution, such as an aqueous solution, provides a beneficial property in a particular use. Some particular examples of functional materials are discussed in more detail below, although the particular materials discussed are given by way of example only, and that a broad variety of other functional ingredients may be used. For example, many of the functional materials discussed below relate to materials used in cleaning. However, other embodiments may include functional ingredients for use in other applications.

In some embodiments, the peroxycarboxylic acid compositions may include stabilizing agents. In other embodiments, the peroxycarboxylic acid compositions may include optical brighteners, defoaming agents, anti-redeposition agents, bleaching agents, solubility modifiers, dispersants, metal protecting agents, soil antiredeposition agents, stabilizing agents, corrosion inhibitors, builders/sequestrants/chelating agents, enzymes, aesthetic enhancing agents including fragrances and/or dyes, additional rheology and/or solubility modifiers or thickeners, hydrotropes or couplers, buffers, solvents, additional cleaning agents and the like. These additional ingredients can be pre-formulated with the compositions or added to the use solution before, after, or substantially simultaneously with the addition of the compositions.

According to embodiments, the various additional functional ingredients may be provided in a composition in the amount from about 0 wt-% and about 50 wt-%, from about 0.01 wt-% and about 50 wt-%, from about 0.1 wt-% and about 50 wt-%, from about 1 wt-% and about 50 wt-%, from about 1 wt-% and about 30 wt-%, from about 1 wt-% and about 25 wt-%, or from about 1 wt-% and about 20 wt-%. In addition, without being limited according to the invention, all ranges recited are inclusive of the numbers defining the range and include each integer within the defined range.

Stabilizing Agents

The peroxycarboxylic acid compositions may include stabilizing agents. Stabilizing agents prevent or slow down the decomposition of peracid in an equilibrium peroxycarboxylic acid composition. According to embodiments, the various stabilizing agents may be provided in a composition in the amount from about 0 wt-% and about 20 wt-%, from about 0.1 wt-% and about 20 wt-%, from about 1 wt-% and about 20 wt-%, from about 1 wt-% and about 10 wt-%, or from about 1 wt-% and about 5 wt-%. According to preferred embodiments, the various stabilizing agents may be provided in a composition in the amount from about 0 wt-% and about 5 wt-%, from about 0.001 wt-% and about 5 wt-%, from about 0.01 wt-% and about 1 wt-%, or from about 0.05 wt-% and about 0.5 wt-%. In addition, without being limited according to the invention, all ranges recited are inclusive of the numbers defining the range and include each integer within the defined range.

Stabilizing agents suitable for use in the peroxycarboxylic acid compositions include for example, pyridine carboxylic acid compound. Pyridine carboxylic acids include dipicolinic acids, including for example, 2,6-pyridinedicarboxylic acid (DPA). In a further aspect, the stabilizing agent is a picolinic acid, or a salt thereof. In an aspect of the invention, the stabilizing agent is a picolinic acid or a compound having the following Formula (IA):

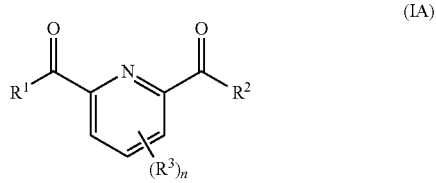

wherein $R^1$ is OH or $-NR^{1a}R^{1b}$, wherein $R^{1a}$ and $R^{1b}$ are independently hydrogen or $(C_1-C_6)$alkyl; $R^2$ is OH or $-NR^{2a}R^{2b}$, wherein $R^{2a}$ and $R^{2b}$ are independently hydrogen or $(C_1-C_6)$alkyl; each $R^3$ is independently $(C_1-C_6)$alkyl, $(C_2-C_6)$alkenyl or $(C_2-C_6)$alkynyl; and n is a number from zero to 3; or a salt thereof.

In a further aspect of the invention, the peracid stabilizing agent is a compound having the following Formula (IB):

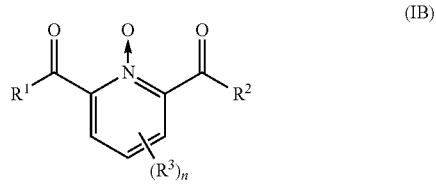

wherein $R^1$ is OH or $-NR^{1a}R^{1b}$ wherein $R^{1a}$ and $R^{1b}$ are independently hydrogen or $(C_1-C_6)$alkyl; $R^2$ is OH or $-NR^{2a}R^{2b}$, wherein $R^{2a}$ and $R^{2b}$ are independently hydrogen or $(C_1-C_6)$alkyl; each $R^3$ is independently $(C_1-C_6)$alkyl, $(C_2-C_6)$alkenyl or $(C_2-C_6)$alkynyl; and n is a number from zero to 3; or a salt thereof. Preferred stabilizing agents include organic compounds, such as dipicolinic acid.

Additional stabilizing agents suitable for use in the peroxycarboxylic acid compositions include for example, phosphonic acids or a phosphonate salt, and aminocarboxylic acids (aminocarboxylic acid type sequestrant). Suitable phosphonic acids and phosphonate salts include, for example, 1-hydroxy ethylidene-1,1-diphosphonic acid (CH3C(PO3H2)2OH) (HEDP); ethylenediamine tetrakis methylenephosphonic acid (EDTMP); diethylenetriamine pentakis methylenephosphonic acid (DTPMP); cyclohexane-1,2-tetramethylene phosphonic acid; amino[tri(methylene phosphonic acid)]; (ethylene diamine[tetra methylene-phosphonic acid)]; 2-phosphene butane-1,2,4-tricarboxylic acid; or salts thereof, such as the alkali metal salts, ammonium salts, or alkyloyl amine salts, such as mono, di, or tetra-ethanolamine salts; or mixtures thereof. In some embodiments, the chelating agent includes 1-hydroxy-ethylidene-1, 1-diphosphonic acid (HEDP). A preferred stabilizing agent includes organic compounds, such as HEDP.

Suitable aminocarboxylic acid type sequestrants or stabilizing agents include, but are not limited to, the acids or alkali metal salts thereof, e.g., amino acetates and salts thereof. Suitable aminocarboxylates include, for example, N-hydroxyethylaminodiacetic acid; methylglycinediacetic acid (MGDA); hydroxyethylenediaminetetraacetic acid; nitrilotriacetic acid (NTA); ethylenediaminetetraacetic acid (EDTA); N-hydroxyethyl-ethylenediaminetriacetic acid (HEDTA); glutamic acid N,N-diacetic acid (GLDA), diethylenetriaminepentaacetic acid (DTPA); Iminodisuccinic acid (IDS); ethylenediamine disuccinic acid (EDDS); 3-hydroxy-2,2-iminodisuccinic acid (HIDS); hydroxyethyliminodiacetic acid (HEIDA); and alanine-N,N-diacetic acid; and the like; and mixtures thereof.

In a preferred embodiment at least two stabilizing agents are included in the compositions, such as dipicolinic acid and HEDP.

In some embodiments, the stabilizing agent is phosphorus free, and further the peroxycarboxylic acid composition is phosphorus free.

In some embodiments the weight ratio of the ionic compound to the stabilizing agent in the composition is between about 8:1 to about 15:1, or between about 8:1 to about 13:1. A significantly greater concentration of the ionic compound is required to deliver conductivity signals, in comparison to conventional use of some of the ionic compounds (e.g. metal salts) for stabilization of peroxycarboxylic acid compositions, which employ mole ratios of metal salts to chelating or stabilizing agents between about 5:1 to about 1:14.

Methods of Use

Peroxycarboxylic acid compositions have many applications of use. They are suitable for cleaning and sanitizing compositions, such as those suited for cleaning hard surfaces and objects and removing soils, scale and/or biofilms from such surfaces and objects, including clean-in-place (CIP) and clean-out-of-place (COP) applications. They are also suitable for sanitizing water sources, treating membranes, laundry applications, instrument and/or device sterilization, and the like. For the various applications of use for peroxycarboxylic acids it is desired for a user to readily ascertain the concentration of the peroxycarboxylic acid to be dosed and/or dispensed for a particular application of use. This ensures sufficient concentrations of the intended cleaning (including removal of soils, scale and/or biofilms), sanitizing and/or disinfecting are provided, as well as reduces any overuse or consumption of the peroxycarboxylic acid compositions. In a preferred aspect, the peroxycarboxylic acid composition is a single use composition.

In addition to the benefits described herein, conductivity measurement allows a user to determine concentration of the peroxycarboxylic acid at a point of use without cumbersome titration steps to determine the concentration providing various benefits at an application of use.

Beneficially, according to some embodiments, the use solutions containing the peroxycarboxylic acid is provided in a stabilized composition that is phosphorus free. In a still further embodiment, the use solutions containing the peroxycarboxylic acid is an organic peroxycarboxylic acid composition. In further embodiments, the use solutions are stabilized, organic peroxycarboxylic acid compositions that are further phosphorus free.

In some embodiments, the compositions containing hydronium salt ionic compound species (e.g. sulfuric acid) at levels of at least about 5 wt-% provide efficacious performance against biofilms, providing stabilized peroxycarboxylic acid compositions that can be conductivity traced. The embodiments using hydronium salt, e.g. sulfuric acid provide benefits for scale removal and/or biofilm removal at an acidic pH in use solution, namely pH below about 3, or below about 2.3. Without being limited to a particular mechanism of action, the sulfuric acid provides a low pH that prevents and removes mineral scales as well as beneficially provides efficacious biofilm kill and removal. In still further embodiments where the compositions contain hydronium salt ionic compound species (e.g. sulfuric acid), there are efficacy benefits against non-biofilm bacterium in addition to biofilms, such as *Listeria* spp., including *Listeria monocytogenes*.

The methods disclosed herein are suitable for use in monitoring and/or detecting the concentration of the peroxycarboxylic acid compositions that are circulated within a system and/or within a cleaning application (e.g. prior to and/or during an application of use). In a still further aspect, the methods are suitable for use in monitoring and/or detecting the concentration of the peroxycarboxylic acid compositions that are stored and/or housed prior to an application of use.

The methods disclosed are suitable for testing a use solution which is particularly useful for a user of the composition at a point of use, as use solutions (as opposed to concentrates) are applied to a surface. A use solution may be prepared from the concentrate by diluting the concentrate with water at a dilution ratio that provides a use solution having desired sanitizing and/or other antimicrobial properties. The water that is used to dilute the concentrate to form the use composition can be referred to as water of dilution or a diluent, and can vary from one location to another. The typical dilution factor is between approximately 1 and approximately 10,000 but will depend on factors including water hardness, the amount of soil, scale and/or biofilm to be removed and the like. In an embodiment, the concentrate is diluted at a ratio of between about 1:10 and about 1:10,000 concentrate to water. Particularly, the concentrate is diluted at a ratio of between about 1:100 and about 1:5,000 concentrate to water. More particularly, the concentrate is diluted at a ratio of between about 1:250 and about 1:2,000 concentrate to water.

The frequency at which the peroxycarboxylic acid concentration of a use solution is monitored (e.g. monitoring frequency) will vary according to the desired applications of use. For example, a monitoring device may be programmed to monitor the concentrations of peroxycarboxylic acid in a use composition at an initial prior to delivery point in time. Alternatively, concentrations can be monitored every 15 minutes, every 30 minutes, every hour, every two hours, every day or other appropriate time. The monitoring frequency/interval may vary depending on, among other things, the particular application to which the use composition is directed and the corresponding threshold concentrations of peroxycarboxylic acid.

The detection sensitivity using the ionic compounds can be from a few ppm to greater than 10,000 ppm. Beneficially, this permits detection of peroxycarboxylic acid concentrations for delivery to various applications of using requiring from 1 ppm and greater.

The detection methods can be conducted at any suitable temperature. In some embodiments, the present methods are conducted at a temperature ranging from about 0° C. to about 70° C., e.g., from about 0° C. to about 4° C. or 5° C., from about 5° C. to about 10° C., from about 11° C. to about 20° C., from about 21° C. to about 30° C., from about 31° C. to about 40° C., including at about 37° C., from about 41° C. to about 50° C., from about 51° C. to about 60° C., or from about 61° C. to about 70° C.

The methods of measuring a peroxycarboxylic acid concentration using conductivity include contacting a peroxycarboxylic acid composition with a conductivity sensor(s) or probe(s). The methods described herein are not limited according to particular sensors, probes and/or cells for measuring the conductivity of the peroxycarboxylic acid composition, so long as the sensors, probes and/or cells are compatible with the acidic peroxycarboxylic acid compositions. Conductivity is measured by in units of mS/cm (equivalent to the representation of the conductivity measurement as µS/cm).

Use of a conductivity probe provides an electroanalytical method to measure parameters of a product. An exemplary conductivity sensors comprises two electrodes, and operates by applying a voltage across the two electrodes and measuring a resulting current. The relationship between the magnitudes of the current and the voltage allow the resistance and therefore conductivity of the product to be determined.

Use of a sensor (may also be referred to as an optical cell and/or an optical detector) also provides an electroanalytical method to measure parameters of a product. Exemplary sensors are disclosed, for example, in the methods and/or apparatuses in U.S. Patent Publication No. 2012/0014912, and U.S. Pat. Nos. 8,835,874, 8,229,204, 8,143,070, 8,119,412, 8,187,540, 8,084,756, 8,076,155, 8,076,154, 7,572,687, and 7,169,236, which are incorporated by reference.

In an embodiment, the methods include providing a sensor, probe and/or cell in a position to contact a peroxycarboxylic acid composition to measure a sample of a use solution. Without being limited to a particular sequence of events for the methods described herein, the conductivity may be measured at various points in the sequence of events described generally herein. In an embodiment the conductivity is measured in a stream or volume of the peroxycarboxylic acid composition prior to dosing. In a further embodiment, the conductivity is preferably measured at an outlet and/or a reservoir of a generator for the peroxycarboxylic acid composition. For example, in various applications an onsite generator for the peroxycarboxylic acid composition may be employed and the concentration of the peroxycarboxylic acid composition can be measured at an inlet, piping, outlet and/or in a reservoir (e.g. storage) for the generated peroxycarboxylic acid composition. In a still further embodiment, the conductivity is measured in a stream or vessel delivering the peroxycarboxylic acid composition in an application of use.

In an embodiment the concentration of the peroxycarboxylic acid composition can be measured by first measuring the conductivity of water as a baseline or control, and the difference between the conductivity reading of the peroxycarboxylic acid use solution vs. water control is used to measure the concentration of peracids.

In an aspect, the measuring of conductivity of a peroxycarboxylic acid composition is used to determine whether a concentration of the peroxycarboxylic acid satisfies at least a minimum threshold concentration for a desired application of use (e.g. soil, scale and/or biofilm removal, or other applications). For example, application specific concentrations may include: Aseptic bottle rinse generally requiring between about 1000-5000 ppm peracid; or Central Sanitizing generally requiring between about 100-1000 ppm peracid.

In an aspect, suitable carriers or solvents for forming a use solution of the peroxycarboxylic acid composition include various types of water. In an aspect, deionized water, soft water and/or hard (e.g. 5 grain or above) water can all be used for measuring conductivity. It is a benefit that the conductivity measurement is achieved without being limited to a particular type of water.

The methods of measuring a peroxycarboxylic acid concentration using conductivity can thereafter include applying or contacting the compositions to equipment, surfaces, substrates, or the like in need of cleaning, sanitizing, disinfecting or the like.

The conductivity measurements can be combined with various other measurements and measurement devices that may be desired for a peroxycarboxylic acid composition, namely an onsite generated peroxycarboxylic acid composition. One or more measurement devices may be combined with the device to measure conductivity. Exemplary measurement devices are those suitable to measure one or more reaction kinetics or system operations for the generation of peroxycarboxylic acid compositions, including for example devices to measure weight, flow (e.g. flow meters or switches), pH, pressure, temperature and combinations thereof. Examples of additional suitable measurement devices include, for example, thermometers, out of product alarms, peroxide monitors, IR/UV/VIS spectroscopy, NMR and pressure switches.

The conductivity measurements employing a conductivity sensor can be combined with various control systems. In some aspects, it may be desirable to have the conductivity measurement capabilities tied with an optional controller or software platform. The software platform can provide a user or system to select a generation mode for a desired peroxycarboxylic acid formulation for on-site generation based on a conductivity measurement. For example, the controller or control software for operation of the system may permit a user or system to select for additional peroxycarboxylic acid formulation and a desired volume and dosage concentration of the formulation for on-site generation based on a conductivity measurement. In a further aspect, the control software may determine the timing, sequencing and/or selection of feeding raw materials (e.g. reagents) into the system, mixing time and total reaction time required for production of the user- or system-selected peroxycarboxylic acid formulation. Various other aspects of a control system are known to those skilled in the art, including for example options for display by the control software platform (e.g. display screens for user interfacing). Examples of suitable controllers are disclosed herein, in addition various embodiments of those disclosed in U.S. Pat. Nos. 7,547,421 and 8,075,857, both entitled Apparatus and Method for Making Peroxycarboxylic Acid, which are herein incorporated by reference in their entirety.

The conductivity measurements can be combined with or include data output means. Data output means are useful for sharing information related to the peroxycarboxylic acid compositions measured by conductivity and/or peroxycarboxylic acid compositions generated onsite and also measured by conductivity. For example, an information backbone may be used to both collect and disseminate data from the process of generating the peroxycarboxylic acid compositions including, for example, composition consumption, dispensing or usage, and additional formulation production-related data. Such data may be generated in real-time and/or provided in a historical log of operational data detectable or storable by a user or system. These and other embodiments of data output means, information sharing, remote system operations and the like, which may be adapted for use with the methods described herein, are further described, for example, in U.S. Pat. Nos. 8,162,175, 7,292,917, 6,895,307, 6,697,706 and 6,377,868 and U.S. Patent Publication Nos. 2005/0065644, 2004/0088076, and 2003/0195656, which are hereby expressly incorporated by reference In an embodiment employing control systems and/or data output means, a user or system is able to monitor usage and performance, including for example, chemistry dispensing, managing chemistry distribution to various point-of-use applications, communication with system operators to control and monitor chemistry dispensing, allocation and/or formulation and the like. According to an additional embodiment, a user or system is able to control systems, including program systems and managing data output, remotely.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

The compositions of Table 5 were analyzed in the Examples and iodometric titration were performed using procedures set forth in QATM 317 to determine peracetic acid and hydrogen peroxide content. The method includes two steps for the determination of the peracid and hydrogen peroxide content. The first step is an iodometric titration while suppressing the hydrogen peroxide oxidative property by dilution and cold temperatures (ice water; the presence of ice does not interfere with the titration chemistry in the reaction flask). The second step uses the same sample and measures hydrogen peroxide content by the addition of sulfuric acid and molybdenum catalyst, reagents that rapidly accelerate the hydrogen peroxide oxidation of iodide. The hydrogen peroxide concentration is determined by taking the difference between the volume of titrant used for the peracid endpoint and the volume required to reach the hydrogen peroxide end point.

1. Titration of peracetic acid: Aliquot the peracid sample into a 250 mL Erlenmeyer flask. Fill the flask to approximately 200 mL with ice water (0° C.-10° C.). Add 2 mL of 2% starch indicator and 5 mL of 10% KI (potassium iodide) to the flask. Place the flask on a stir plate and immediately titrate with 0.1N sodium thiosulfate to a colorless endpoint that persists for at least 20 seconds. Record the titrant volume (EP1).

2. Titration of hydrogen peroxide: Do not refill the burette from the peracetic acid titration. Add 12 mL 9N sulfuric acid and 10-15 drops of 1N ammonium molybdate to the flask. The solution will change back to a blue-black color. Titrate to a second colorless endpoint that persists for at least 20 seconds. Record the titrate volume (EP2).

The peracetic acid and hydrogen peroxide content are calculated as follows:

Peracetic Acid Content:

$$\% \text{ Peracetic Acid} = \frac{(\text{mL to } EP1) * N * 38 * 100\%}{(spl \text{ wt, g}) * 1000}$$

Where N=normality of thiosulfate titrant
38=equivalent weight of Peracetic Acid
1000=conversion from milliequivalents to equivalents
Hydrogen Peroxide Content:

$$\% H_2O_2 = \frac{(mL \text{ to } EP2 - mL \text{ to } EP1)*N*17*100\%}{(spl \text{ wt, g})*1000}$$

Where N=normality of thiosulfate titrant
17=equivalent weight of hydrogen peroxide
1000=conversion from milliequivalents to equivalents

TABLE 5

| Raw Material | Formulation 1 Wt. % | Formulation 1A Wt. % | Formulation 2 Wt. % | Formulation 2A Wt. % | Formulation 2B Wt. % |
|---|---|---|---|---|---|
| Acetic Acid | 19 | 18.9 | 24.5 | 24.5 | 24.5 |
| $H_2O_2$ (50%) | 62 | 62 | 25 | 25 | 25 |
| HEDP (60%) | 2.5 | 3.0 | 1.0 | 0.0 | 0.0 |
| Dipicolinic acid | 0.05 | 0.1 | 0.05 | 0.05 | 0.075 |
| Ionic Compound $MgSO_4 \cdot 7H_2O$ | 16 | 16 | 0.0 | 0.0 | 0.0 |
| Ionic Compound $H_2SO_4$ (50%) | 0.0 | 0.0 | 36 | 36 | 36 |
| DI water | 0.45 | 0.00 | 13.45 | 14.45 | 14.43 |
| Total | 100 | 100 | 100 | 100 | 100 |
| POAA % at equilibrium | 12.36 | 12.38 | 9.18 | 8.92 | 9.03 |
| $H_2O_2$% at equilibrium | 25.12 | 25.13 | 8.15 | 8.32 | 8.28 |
| POAA lost after 6 weeks at 40° C. | 14.72% | 9.19% | 10.01% | 10.01% | 3.82% |

Example 1

The conductivity of Formulation 1 (ionic compound $MgSO_4$) and Formulation 2 ($H_2SO_4$) ionic compound were compared at a 120 ppm peroxyacetic acid concentration using various water sources to determine any impact on conductivity. The conductivity was measured by LMIT09 conductivity measuring device (with temperature compensation capacity), manufactured by Ecolab Engineering GmbH, Siegsdorf, Germany.

The results are shown in Table 6 comparing the peroxycarboxylic acid composition conductivity using the various water sources. Oxonia Active (5.25-6.4% POAA, 25.6-29.4% $H_2O_2$) was used as a positive control for comparison.

TABLE 6

| | Conductivity (mS/cm) | | | |
|---|---|---|---|---|
| Water | Water | 120 ppm PAA (Oxonia Active) | 120 ppm PAA (Formulation 1) | 120 ppm PAA (Formulation 2) |
| DI | 0.00 | 0.10 (0.10) | 0.21 (0.21) | 1.47 (1.47) |
| 5 Grain | 0.18 | 0.17 (−0.10) | 0.28 (0.10) | 1.19 (1.01) |
| 17 Grain | 0.49 | 0.47 (0.02) | 0.57 (0.08) | 0.56 (0.07) |
| Soft | 0.51 | 0.50 (0.01) | 0.61 (0.10) | 0.64 (0.13) |
| 17 Grain Plus | 0.99 | 0.97 (0.02) | 1.07 (0.08) | 1.03 (0.04) |

For the 17 Grain Plus water 500 ppm $NaHCO_3$ was added to 17 G water to provide an increased water hardness threshold for the conductivity measurement. As shown a conductivity for water alone was initially tested. The conductivity for the Control, Formulation 1 and Formulation 2 were then tested and the data in parenthesis shown the differences between the evaluated formula and water.

The results show that using DI (deionized) water the Control, Formulation 1 and Formulation 2 detected the active concentration of the peroxyacetic acid concentration. However, when soft water and 5 grain water were used only Formulation 1 and Formulation 2 containing the ionic compound were able to accurately measure the concentration by conductivity, as evidenced by the difference in mS/cm greater than 0.1. The results show the 17 grain plus water with extremely high level hardness and alkalinity, were able to achieve conductivity for Formulation 1.

Example 2

Figure 2:
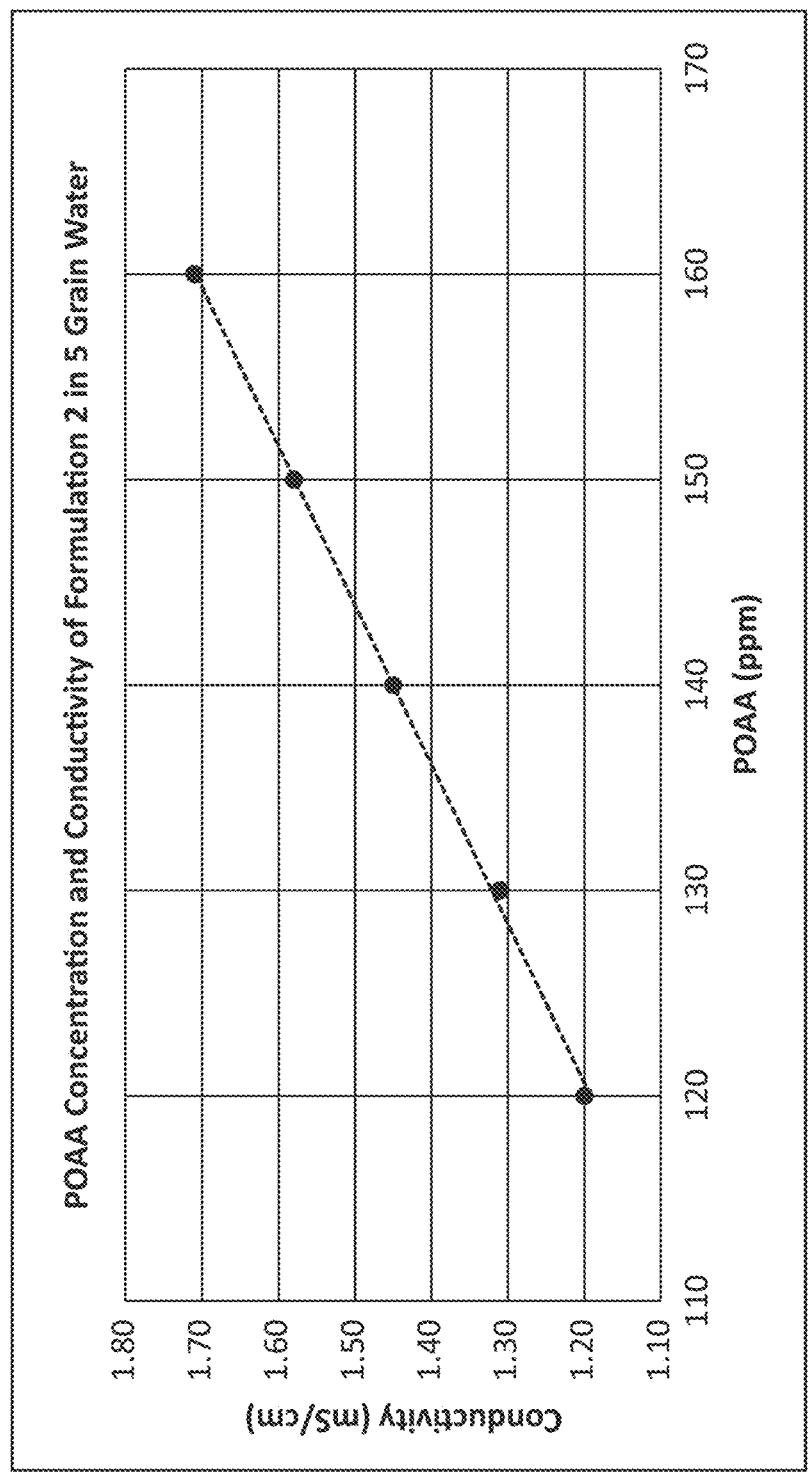
FIG. 2 shows a graph measurement of peroxyacetic acid concentration and conductivity measurement using Formulation 2 of the evaluated peroxycarboxylic acid compositions disclosed in the Examples.

Further testing of Formulations 1 and 2 were conducted to assess impact of peroxyacetic acid concentration on conductivity measurements. The measurements were taken at increasing concentrations in 5 grain water. The results are shown in FIG. 1 and FIG. 2, where the relationship between concentration of peroxyacetic acid and conductivity reading when diluted in 5 grain water. As demonstrated in the Figures, the linear response between the concentration of peroxyacetic acid and conductivity reading were observed for both Formulation 1 and 2, providing a base to monitor the peroxyacid concentration by conductivity in use solution.

Example 3

Upon demonstration of compatibility of the ionic compounds in Examples 1 and 2 for conductivity measurements, further testing was conducted to confirm that the ionic compounds do not negatively interfere with the antimicrobial efficacy of the peroxycarboxylic acid.

Oxonia Active (5.25-6.4% POAA, 25.6-29.4% $H_2O_2$) was used as a positive control for comparison as well as Oxonia Active with the addition of $H_2SO_4$ and $MgSO_4$ in separate test formulations. The test concentrations (POAA) are equal among Oxonia Active and the $H_2SO_4$ and $MgSO_4$ compositions. Formulations 1 and 2 were also analyzed. 30 second exposures of the *S. aureus* and *E. coli* to each formulation were conducted. The log reduction in *S. aureus* and *E. coli* was then measured. The ATCC numbers tested is 7 to 8 log.

Figure 3:
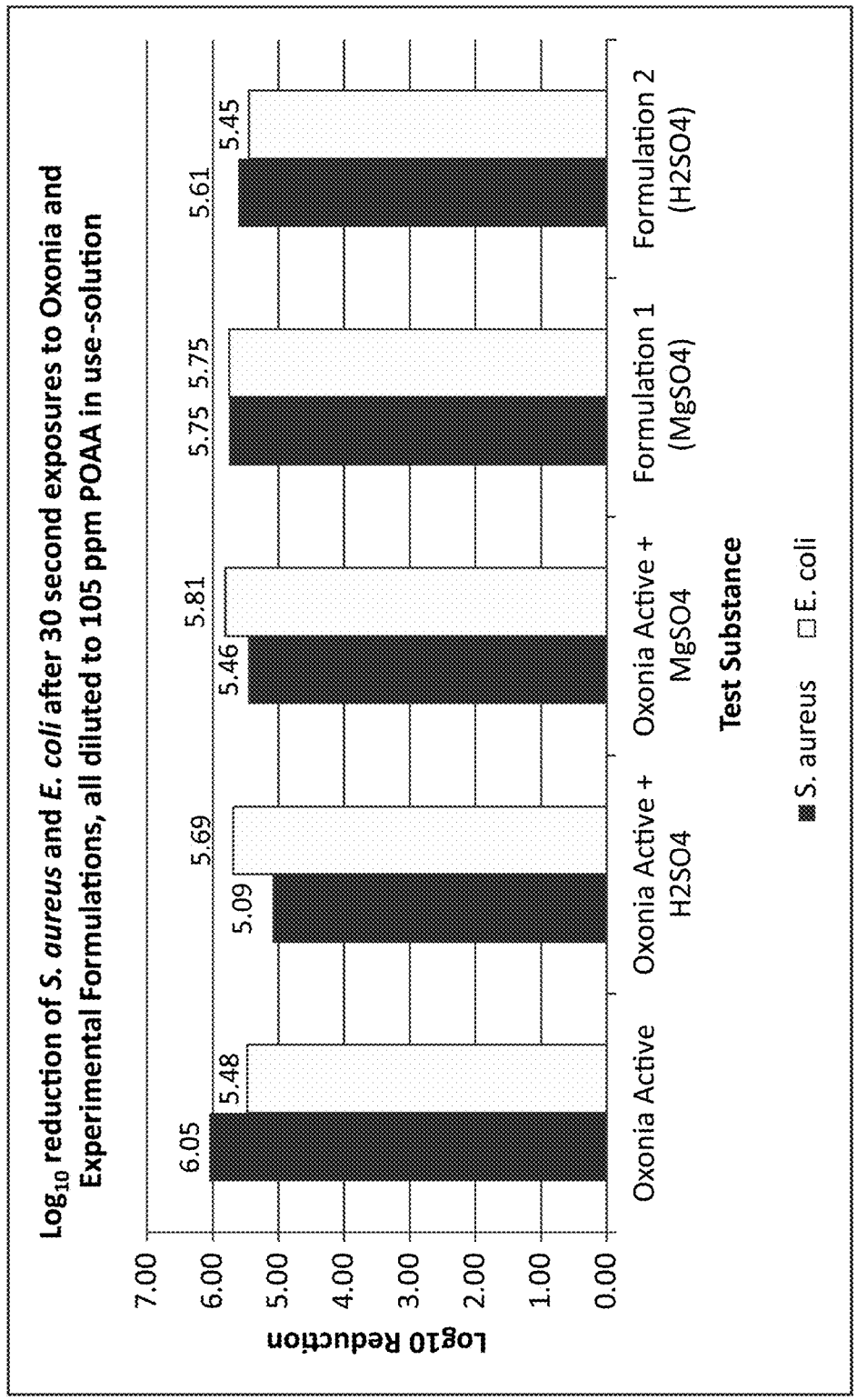
FIG. 3 shows a graph measurement of impact of the ionic compounds in the evaluated peroxycarboxylic acid compositions disclosed in the Examples on antimicrobial efficacy against *S. aureus* and *E. coli* at a use solution.

The results are shown in FIG. 3 where there is substantially similar performance in all evaluated formulations, as measured based on less than a 1 log difference in antimicrobial efficacy compared to Control. All formulations provided greater than a 5 log reduction against both *S. aureus* and *E. coli* at a use solution of 105 ppm of the peroxyacetic acid.

Example 4

Figure 4:
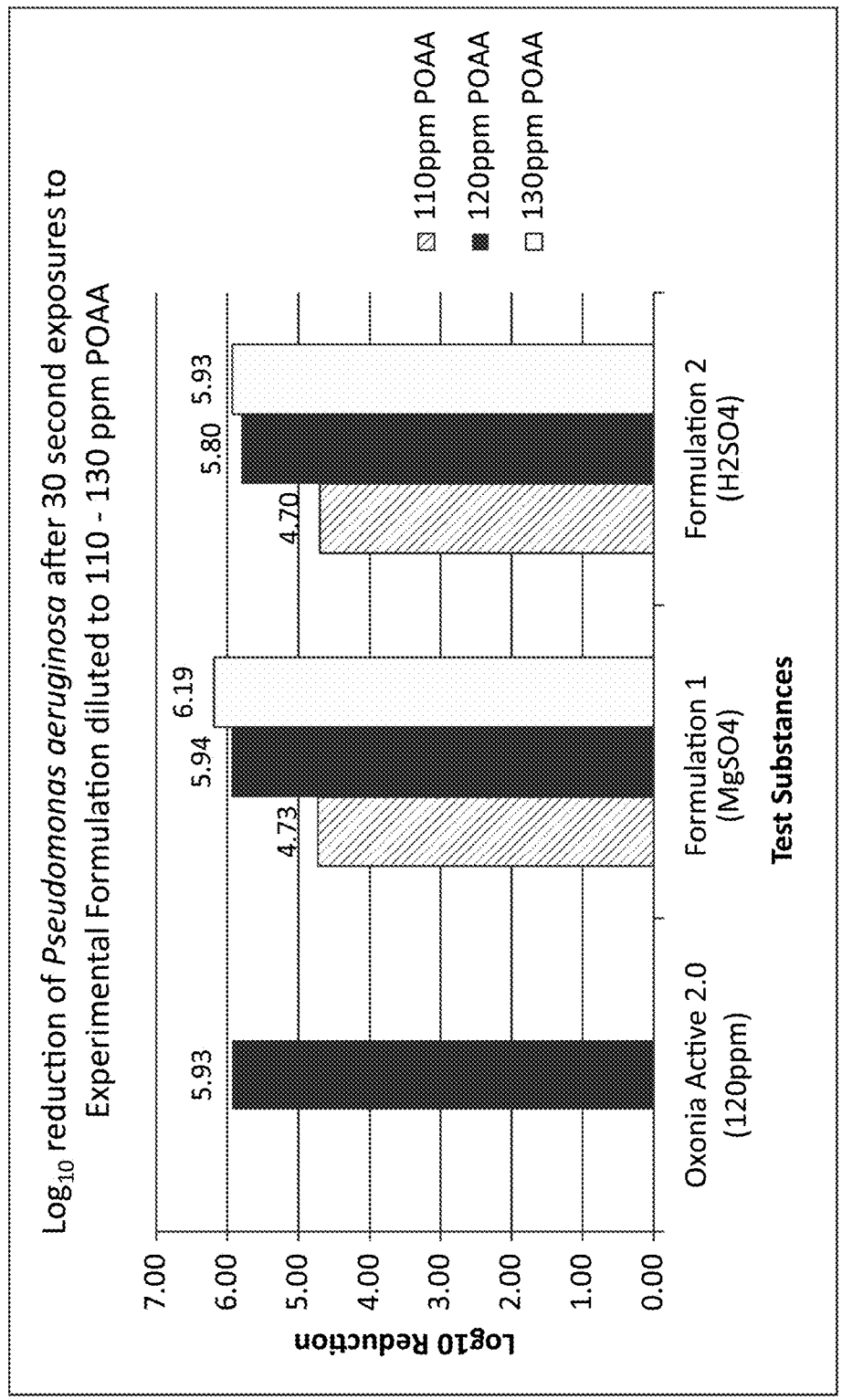
FIG. 4 shows a graph measurement of impact of the ionic compounds in the evaluated peroxycarboxylic acid compositions disclosed in the Examples on antimicrobial efficacy against *P. aeruginosa* at a use solution.

Additional testing to show compatibility of the ionic compounds in Examples 1 and 2 across various concentration ranges in use was conducted. Formulations 1 and 2 were again compared to the Control Oxonia Active at a concentration of 120 ppm. The test formulations were evaluated at 110 ppm, 120 ppm and 130 ppm use concentrations. 30 second exposures of the *Pseudomonas aeruginosa* to each formulation were conducted. The log reduction in *Pseudomonas aeruginosa* was then measured. The results in FIG. 4 show that both Formulations 1 and 2 provide equivalent antimicrobial efficacy at 120 ppm and 130 ppm use concentrations.

Example 5

Further evaluation of peroxycarboxylic acid compositions comprising compatible ionic compounds to deliver conductivity signals to enable monitoring of the peroxycarboxylic acid concentration by conductivity when diluted for use were conducted. These conductivity measurements beneficially allow a user to determine concentration of the peroxycarboxylic acid at a point of use without cumbersome titration steps to determine the concentration providing various benefits at an application of use. As an additional benefit, the use of the hydronium salt, e.g. sulfuric acid provides further benefits for scale removal. Without being limited to a particular mechanism of action, the sulfuric acid provides a low pH that prevents and removes mineral scales. Dissolution experiments were performed to evaluate the solubility of various calcium ($Ca^{2+}$) mineral salts in Oxonia Active (5.25-6.4% POAA, 25.6-29.4% $H_2O_2$) and Formulation 2 ($H_2SO_4$). The calcium mineral salts evaluated were calcium phosphate, or hydroxyapatite [$Ca_5(PO_4)_3(OH)$], and calcium carbonate ($CaCO_3$).

Experiment Procedure:

1. Preparation of test solutions: 100 mL test solutions of Oxonia Active two of each at the following concentrations: 0.20%, 0.24%, and 0.28% v/v; 100 mL test solutions of Formulation 2 two of each at the following concentrations: 0.11%, 0.15%, and 0.20% v/v were prepared in DI water in separate 150 mL beakers. Place a 1-inch stir bar into each beaker. Place each beaker on a stir plate and mix solutions at 300 RPM for a minimum of one minute to ensure homogenous solutions are prepared. Assign one set of the solutions (Oxonia Active: 0.20%, 0.24%, and 0.28% v/v; Formulation 2: 0.11%, 0.15%, and 0.20% v/v) to be used in combination with calcium phosphate salt, and assign the other set of solutions (Oxonia Active: 0.20%, 0.24%, and 0.28% v/v; Formulation 2: 0.11%, 0.15%, and 0.20% v/v) to be used in combination with calcium carbonate salt.

2. Addition of calcium mineral salts: Add 2-5 grams of the desired calcium salt to the solution. Continue to add the calcium salt until the solution cannot dissolve further (solution becomes cloudy). Stir the solution at 300 RPM for 5 minutes. Do not apply heat to solutions.

3. Filtration of undissolved calcium salts: At the completion of 5 minutes, extract ~20 mL of solution via a 30 mL plastic syringe (Luer-Lok™ Tip REF 305618). Attach a 0.45 µm syringe filter (VWR® Syringe Filter, 25 mm, 0.45 µm Nylon Membrane) to the tip of the syringe and collect the filtered solution in a small sample container.

4. Quantify calcium in solution: Analyze the filtered solution via ICP-MS (Inductively Coupled Plasma Mass Spectrometry) to quantify the dissolved calcium in each solution.

Figure 5:
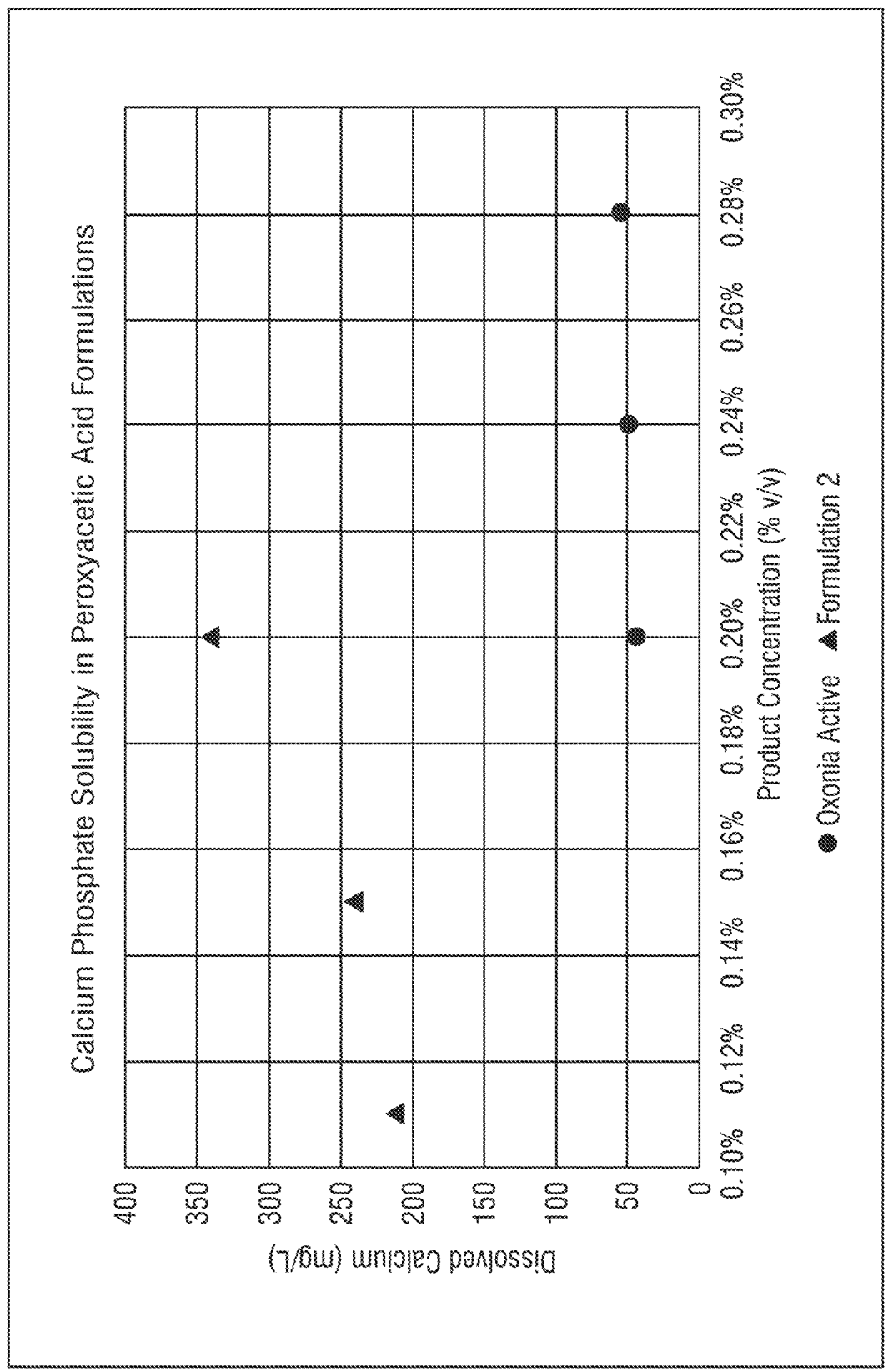
FIG. 5 shows a graph of calcium phosphate solubility in peroxyacetic acid formulations; Dissolved calcium in solutions of Oxonia Active (0.20%, 0.24%, and 0.28% v/v) and Formulation 2 (0.11%, 0.15%, and 0.20% v/v) by addition of calcium phosphate (300 RPM, 5 minutes, 25° C.).
Figure 6:
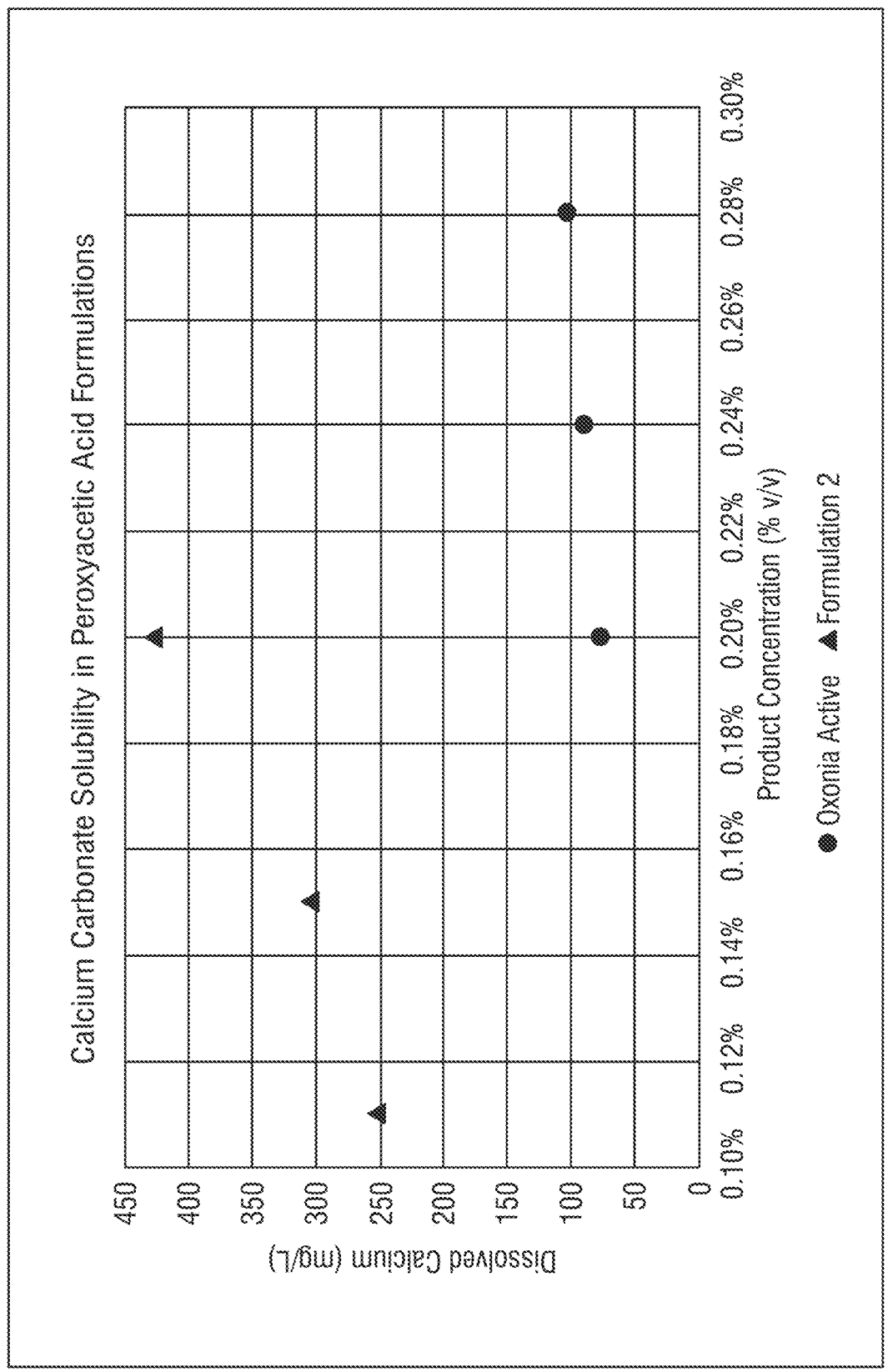
FIG. 6 shows a graph of calcium carbonate solubility in peroxyacetic acid formulations; dissolved calcium in solutions of Oxonia Active (0.20%, 0.24%, and 0.28% v/v) and Formulation 2 (0.11%, 0.15%, and 0.20% v/v) by addition of calcium carbonate (300 RPM, 5 minutes, 25° C.).

Results and Discussion:

Each solution of Oxonia Active and Formulation 2 was analyzed via ICP-MS to quantify the amount of calcium dissolved by addition of calcium phosphate or calcium carbonate. The concentrations chosen for Oxonia Active and Formulation 2 represent concentrations which achieve microbial efficacy for Food Contact Sanitization while remaining below the EPA allowable no-rinse concentrations for all ingredients included in the formulation (40 CFR § 180.940). It was observed that Formulation 2 dissolves significantly more calcium salt (both calcium phosphate and calcium carbonate) at lower concentrations than Oxonia Active. At equivalent concentrations of 0.20% v/v, the solution of Formulation 2 contained 342 mg/L of calcium from the addition of calcium phosphate, whereas the solution of Oxonia Active contained only 44 mg/L of calcium (FIG. 5). Similarly, at equivalent concentrations of 0.20% v/v, the solution of Formulation 2 contained 428 mg/L of calcium from the addition of calcium carbonate, whereas the solution of Oxonia Active contained only 78 mg/L of calcium (FIG. 6).

The results above demonstrate that Formulation 2 has a significantly higher ability to aid in mineral soil removal of common mineral soils found in food and beverage manufacturing environments (hard water scale from calcium carbonate and milk stone from calcium phosphate) over standard peroxyacetic acid sanitizing compositions such as Oxonia Active. The increased capacity of calcium solubility in Formulation 2 may allow for a reduction in the frequency of acid washing to remove mineral scales.

Example 6

Self-Accelerating Decomposition Test (SADT) evaluations were conducted. SADT refers to the lowest temperature at which self-accelerating decomposition may occur with the peroxycarboxylic composition. In some embodiments, SADT refers to the lowest temperature at which self-accelerating decomposition may occur under the commercial packaging, storage, transporta-tion and/or use condition(s). SADT can be estimated, calculated, predicted and/or measured by any suitable methods. The full test protocol used in this Example is available at "Recommendations on the Transport of Dangerous Goods," Manual of Tests and Criteria, 5th revised edition: (United Nations): Classification procedures, test methods and criteria relating to self-reactive substances of Division 4.1 and organic peroxides of Division 5.2: Test H.4 Heat accumula-tion storage test (28.4.4).

Since peroxycarboxylic acids fall into the organic peroxides classification and therefore are self-reactive, self-heating products, testing was conducted to demonstrate if cooling is required for a given package of a peroxycarboxylic acid product. This testing models a large volume package with Dewar flasks. In this example an oven temperature of 50° C. was used for Sphere Dewar with 3 rods, 1.0 L volume, and heat transfer coefficient of 40 mW/Kg K (equivalent to 300 gallon totes for peracid). Each sample volume was 800 mL (952 grams). The Dewar flask is filled to 80% of full volume with the product, fitted with the specific closure and a recording thermometer, and is placed in an oven set at 50° C. Once the internal package temperature warms to 48° C. temperature, time recording is begun. If the temperature exceeds the oven temp of 50° C. by a magnitude of 6° C. before 7 days have elapsed the SADT for the product is defined as <55° C. If the temperature does not exceed the 6° C. rise over the oven temperature the SADT is deemed >55° C. and may be considered for shipping and storage without refrigeration.

Figure 7:
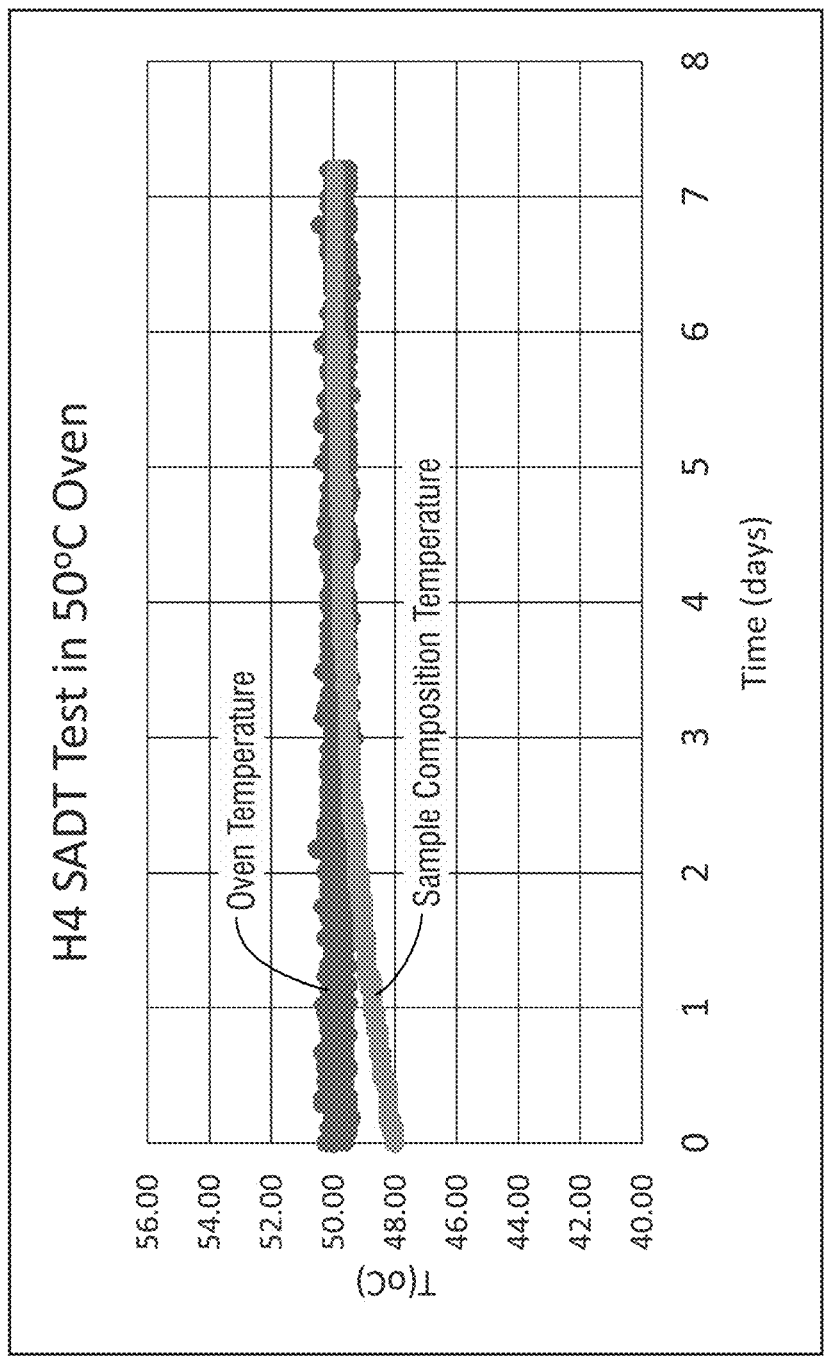
FIG. 7 shows a graph of the SADT study of peroxycarboxylic acid composition containing an ionic compound for conductivity monitoring.

The results are shown in FIG. 7. where the top line shows the oven temperature and the lower line is the sample composition temperature.

Example 7

Evaluation of peroxycarboxylic acid stability using a peroxyacetic acid (POAA) composition with hydrogen peroxide ($H_2O_2$) was evaluated at 40° C. and 54° C. conditions to confirm that POAA and $H_2O_2$ concentrations do not decrease over time, which would indicate that the presence of the ionic compound has a negative impact on the stability of the compositions. To predict the stability of POAA and $H_2O_2$ in the concentrate solution, accelerated stability tests were performed in accordance with EPA recommendations (Guidelines 830.6317 and 830.6320). The EPA recommends incubating solutions at elevated temperatures for various time periods to assess the long-term stability of active antimicrobial ingredients (40° C. for four (4) weeks, or 54° C. for two (2) weeks). These conditions are accepted as predictors for twelve-month room temperature stability.

A sample of Formulation 2 were prepared and stored at 40° C. for four weeks. POAA and $H_2O_2$ concentrations were measured at the beginning and end of the incubation period via iodometric titrations. After four weeks of incubation at 40° C., the measured loss of POAA and $H_2O_2$ concentrations was 1.74% and 2.69%, respectively.

Three samples of Formulation 2 were prepared and stored at 54° C. for two weeks. POAA and $H_2O_2$ concentrations were measured at the beginning and end of the incubation period via iodometric titrations. After two weeks of incubation at 54° C., the maximum measured loss of POAA and $H_2O_2$ concentrations across all three samples was 6.79% and 5.53%, respectively.

It is to be understood that while the invention has been described in conjunction with the detailed description thereof, the foregoing description is intended to illustrate, and not limit the scope of the invention, which is defined by the scope of the appended claims. Other embodiments, advantages, and modifications are within the scope of the following claims. In addition, the contents of all patent publications discussed supra are incorporated in their entirety by this reference.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

What is claimed is:

1. A method of cleaning, sanitizing and/or disinfecting a surface consisting of:
   diluting a concentrate peroxycarboxylic acid composition consisting of at least about 5 wt-% of an ionic compound consisting of a magnesium salt or hydronium salt for conductivity monitoring, from about 5 wt-% to about 20 wt-% of a peroxycarboxylic acid, from about 15 wt-% to about 40 wt-% of a carboxylic acid, from about 5 wt-% to about 50 wt-% of hydrogen peroxide, from about 0.001 wt-% to about 5 wt-% of a stabilizing agent(s), and water;
   forming a use solution consisting of said diluted peroxycarboxylic acid composition;
   contacting a surface in need of cleaning, sanitizing and/or disinfecting with the use solution;
   contacting a conductivity probe or sensor consisting of two electrodes to the use solution;
   detecting conductivity signals from the ionic compound prior to and/or during an application of use to determine a peroxycarboxylic acid concentration in the use solution; and
   removing soils, scale and/or biofilm from the surface and/or killing microorganisms to clean, sanitize and/or disinfect the surface.

2. The method of claim 1, wherein the carboxylic acid is a C1-C22 carboxylic acid and wherein the peroxycarboxylic acid is a C1-C22 peroxycarboxylic acid.

3. The method of claim 1, wherein the ionic compound is the magnesium salt.

4. The method of claim 1, wherein the ionic compound and the peroxycarboxylic acid have a ratio between about 5:1 to about 1:5 in the concentrate peroxycarboxylic acid composition to detect conductivity readings to determine the concentration of the peroxycarboxylic acid dosed for the cleaning, sanitizing and/or disinfecting of the surface.

5. The method of claim 1, wherein the stabilizing agent and the ionic compound have a ratio between about 1:8 to about 1:15 in the concentrate peroxycarboxylic acid composition.

6. The method of claim 1, wherein the peroxycarboxylic acid composition is phosphorus free.

7. The method of claim 1, wherein the magnesium salt is magnesium sulfate and the hydronium salt is sulfuric acid.

8. The method of claim 1, wherein the carboxylic acid is acetic acid, wherein the stabilizing agents are dipicolinic acid and phosphonic acid, and wherein the composition is organic.

9. The method of claim 1, wherein the carboxylic acid consists of a C1-C22 carboxylic acid, wherein the water is between about 0.1-20 wt-%, and the ionic compound is between about 5-50 wt-% of the concentrate peroxycarboxylic acid composition.

10. The method of claim 5, wherein the pH of the use solution of the diluted peroxycarboxylic acid composition is between about 2 and about 9.

11. The method of claim 5, wherein the pH of the use solution of the diluted peroxycarboxylic acid composition is below 5.

* * * * *